Nov. 15, 1932.  K. A. WIDEGREN ET AL  1,887,610
CENTRIFUGAL FRICTION CLUTCH
Filed July 11, 1929
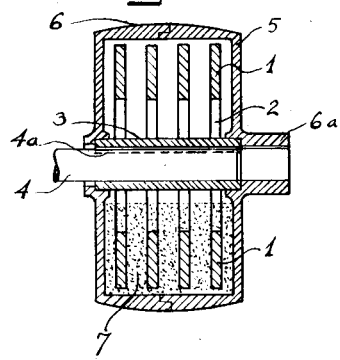
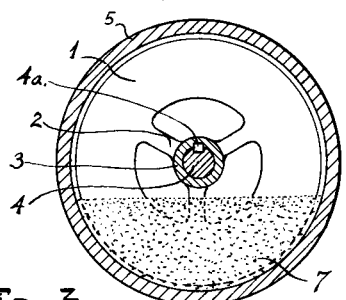
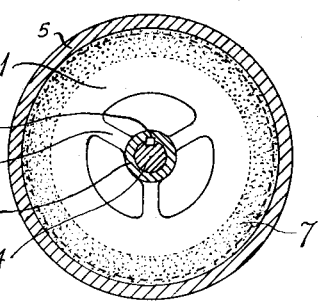
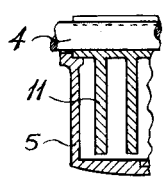
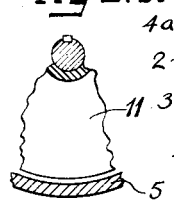
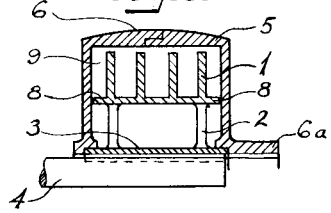
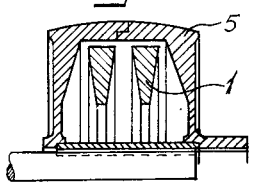
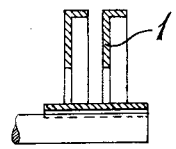
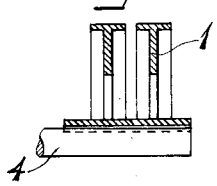

Patented Nov. 15, 1932

1,887,610

UNITED STATES PATENT OFFICE

KLAS AUGUST WIDEGREN AND EMIL HENRIK WIDEGREN, OF HERSERUD, SWEDEN

CENTRIFUGAL FRICTION CLUTCH

Application filed July 11, 1929, Serial No. 377,521, and in Sweden July 11, 1928.

This invention relates to a friction clutch, in which the connection of the clutch members is automatically controlled by the centrifugal force and which is so arranged, that it permits slipping at starting and overloading but acts as a fixed clutch at normal load.

The clutch comprises substantially three members, viz. one member consisting of two or preferably a plurality of rings encircling a horizontal or substantially horizontal shaft and fixed centrally to the same at a distance from one another, a second member consisting of a casing with a single unobstructed chamber and with a motion transmitting means enclosing said rings and a third member consisting of a solid matter in the shape of loosely mounted grain, powder or the like, which fills up the casing partially.

In the accompanying drawing some embodiments of the invention are shown. Fig. 1 is a longitudinal section and Figs. 2 and 3 are transverse sections with regard to the axis of rotation. Fig. 4 shows a longitudinal section of a modified form. Figs. 5 to 7 inclusive show some different forms of the casing and the rings. Figs. 1 to 3 show a complete section of the clutch, while the other figures only show one half of the clutches respectively. Figs 3a, 3b, and 3c show modified details of the arrangement.

Rings 1, Figs 1 to 3, are fixed to the hub 3 by means of spokes 2, the said hub being connected to the shaft 4 by a key 4a. A casing 5 is rotatably mounted on the hub 3. The casing is supplied with motion transmitting means, either a belt pulley 6 or a shaft coupling 6a. The casing 5 is filled partially with grains, powder or the like 7. The said granular or finely divided matter may not fill up the casing in such a degree, that it is subjected to pressure but must rest loosely in the same.

According to Fig. 4 the rings 1 are combined with a cylindrical mantle 8 firmly connected to the rings and fitting closely to the inner sides of the casing 5. The granular matter is placed in the chamber 9 constituted by the cylindrical mantle 8 and the casing 5. The casing and other parts of all clutches are divided in a suitable manner for facilitating the assembling of the parts of the clutches.

Referring to Figs. 1 to 3 the mode of operation of the invention is as follows: The rings 1 may be driven by a motor and are consequently, put into rotation as the motor is started. When the clutch does not rotate the granular matter is located in the lower part of the casing 5 as shown in Figs. 1 and 2 and partly fills up the space between the rings 1. When the rings are put into rotation they, as the speed of rotation is increased, carry with them more and more of the granular matter, which by the centrifugal force is forced outwards towards the periphery. The casing at first does not partake in the rotary motion but as the speed of the rings and of the granular matter increases the casing starts rotating. The granular matter is more and more pressed against the periphery and is evenly distributed around the same as shown in Fig. 3. Finally the casing and the rings will be fully connected with each other and thus rotate with the same speed.

At the starting of the rotary motion of the rings 1 the resistance to its motion is to begin with very slight, which is of great importance especially when great machines are to be driven by the motor. If the machine, driven by the motor, for some reasons is overloaded, the rings slip inside the casing, damages of the machine and the plant as a whole are prevented, interruption avoided and, with regard to electrical machine fuses are saved. In addition to the slight resistance at the starting of the rotary motion, the advantage is gained that the granular matter is very uniformly distributed round the periphery of the casing, so that the balancing of the clutch will be very good.

The details of the invention may, evidently, be modified in several respects without exceeding the limits of the same. Some modifications are stated below.

The rings 1 can be fastened to the hub 3 by extending the rings inwards. By this arrangement the rings and the supporting part gets the shape of discs 11 as shown in Figs. 3a and 3b the former being a longitudinal and the latter a cross section of a part of the rings and casing.

One sectional shape of the casing 5 is shown in Fig. 5. In conjunction with this shape of the casing the ring 1 preferably has the sectional shape shown in the same figure. Figs. 6 and 7 show diagrammatically two further shapes of the ring.

The inner side of the casing 5 or the sides of the rings or both the said sides of the casing and the rings preferably are rough or provided with grooves or the like for increasing the friction between the surfaces and the granular matter and for facilitating the distribution of the matter round the casing at the starting. In Figs. 3c is shown a side either of a ring or of the casing provided with grooves 10. With regard to the ring the cross section is taken along a cylindrical plane concentric to the shaft and for the casing along a plane vertical to the shaft. In both cases the section is laid out.

The power of the motor can, as anticipated above, be transmitted to the rings 1 through the shaft 4, whereby the power is transmitted to the machine from the casing 5 through the belt pulley 6 or the shaft coupling 6a, but the motor can also be connected to the casing by means of the belt pulley 6 or the shaft coupling 6a, the power being transmitted to the machine through the shaft 4. Other modifications of the device may be used.

We claim:

1. In a centrifugal friction clutch the combination of at least two rings encircling a shaft and being centrally fixed to the same at a distance from one another, said shaft being in its working position horizontal, a casing with a single unobstructed chamber enclosing the rings, said casing being rotatable and supplied with a motion transmitting means, a granular matter located in the said casing and resting loosely in the same, said matter under the action of the centrifugal force being pressed against the surfaces of the casing and the rings and thus at a certain rotation speed connecting the casing and the rings so that they are brought to rotate together.

2. In a centrifugal friction clutch the combination of a cylindrical sleeve concentrically surrounding a horizontal shaft and fixed to the same, at least two rings encircling this sleeve and being fixed to the same at a distance from one another, a casing with a single unobstructed chamber enclosing the sleeve and rings, the ends of said sleeve slidably fitting the inner sides of the casing, and the casing being rotatable and supplied with a motion transmitting means, a granular matter located within the chamber formed between said sleeve and the casing and resting loosely in the same, said matter under the action of the centrifugal force being pressed against the surfaces of the casing and the rings and thus at a certain rotation speed connecting the casing and the rings so that they are brought to rotate together.

In testimony whereof we have hereunto affixed our signatures.

KLAS AUGUST WIDEGREN.
EMIL HENRIK WIDEGREN.